Patented Aug. 28, 1923.

1,466,329

UNITED STATES PATENT OFFICE.

HARRY P. BASSETT, OF CYNTHIANA, KENTUCKY.

PROCESS OF ACETYLIZING CELLULOSE.

No Drawing.   Application filed May 11, 1921. Serial No. 468,695.

*To all whom it may concern:*

Be it known that I, HARRY P. BASSETT, a citizen of the United States, residing at Cynthiana, in the county of Harrison and State of Kentucky, have invented certain new and useful Improvements in Processes of Acetylizing Cellulose, of which the following is a specification.

This invention relates to processes of acetylizing cellulose and similar substances.

An object of the present invention is to recover the acetylizing material for reuse in the process.

A further object is to employ sulfur chlorid and dry chlorine gas to treat the recovered acetylizing material and to recover the mono-chlor-acetic acid formed.

In practicing the process, suitable cellulose material such as bleached cotton linters is first treated with acetic anhydride containing sulfuric acid or other mineral acid or acid salt. A small amount of benzol, toluol, or other coal tar product is added to the mixture and the mixture allowed to stand for a sufficient length of time to acetylize the cellulose. The excess acetylizing mixture is removed from the cellulose acetate formed and the cellulose acetate washed, dried, and treated in any other manner for purifying.

The recovered acetylizing mixture is then distilled to recover the benzol, toluol, or similar material employed. Sulfur chlorid is then added to the residue, and the residue treated with dry chorine, forming acetyl chlorid and a small amount of mono-chloracetic acid. The mono-chlor-acetic acid is separated and recovered for use in the arts. The acetyl chlorid is then treated with anhydrous sodium acetate and distilled, forming acetic anhydride which may be employed in practicing the process.

In a typical embodiment of the invention, the acetylizing mixture is prepared in substantially the proportions of 300 parts of 80 per cent acetic anhydride (20 per cent acetic acid), 1200 parts of benzol, and 10 parts of 5 per cent sulfuric acid. As stated, other acid may be employed in place of sulfuric acid, such as benzene sulfonic acid, phosphoric acid, and other mineral acids and acid salts. In place of benzol, toluol, and other coal tar products may be employed. The cellulose to be treated, preferably in a purified condition, such as bleached cotton linters is then added to the mixture, the acetylizing mixture being employed in excess of the theoretical requirements.

This mixture is allowed to stand until tests show that the cellulose has been completely acetylized, or acetylized to the desired degree. I have found that in actual practice, a period of about 18 hours is generally sufficient for acetylizing. The cellulose acetate formed is separated in any suitable manner from the excess acetylizing mixture. The use of a centrifugal machine for separating the cellulose acetate is advantageous. Upon separation, the cellulose acetate is washed, dried, and treated in any other manner desired for placing it in condition for the market.

The recovered acetylizing mixture is first distilled to recover the toluol, or other diluent. The residue is then treated with sulfur chlorid and dry chlorine gas is lead into the mixture for sufficient length of time to permit complete reaction between the chlorine gas and the acetyl radicle. During the chlorine treatment, a small amount of monochlor-acetic acid is formed which is separated from the acetyl chlorid formed and recovered for use in the arts.

The acetyl chlorid is then treated with sodium acetate and distilled to form acetic anhydride.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

Having thus described my invention, I claim:

1. A process of the character described which comprises treating cellulose with an acetylizing mixture containing substantially 300 parts of 80 per cent acetic anhydride, 1200 parts of a coal tar product, and 10 parts of sulfuric acid, separating cellulose acetate, removing the coal tar product from the mixture by distillation, and treating said mixture to recover acetic anhydride.

2. A process of the character described which comprises treating cellulose with an acetylizing mixture containing substantially 300 parts of 80 per cent acetic anhydride, 1200 parts of benzol, and 10 parts of sulfuric acid, separating cellulose acetate, removing the benzol from the mixture by distillation, and treating said mixture to recover acetic anhydride.

3. A process of the character described which comprises treating cellulose with an acetylizing mixture containing substantially 300 parts of 80 per cent acetic anhydride, 1200 parts of a coal tar product, and 10 parts of sulfuric acid, separating cellulose acetate, removing the coal tar product from the mixture by distillation, adding sulfur chloride to the remaining material, and treating said material with chlorine gas to form acetyl chloride.

4. A process of the character described which comprises treating cellulose with an acetylizing mixture containing substantially 300 parts of 80 per cent acetic anhydride, 1200 parts of a coal tar product, and 10 parts of sulfuric acid, separating cellulose acetate, removing the coal tar product from the mixture by distillation, adding sulfur chloride to the remaining material, treating said material with chlorine gas to form acetyl chloride, and treating the acetyl chlorid with sodium acetate to form acetic anhydride.

In testimony whereof I affix my signature in presence of two witnesses.

HARRY P. BASSETT.

Witnesses:
   CURTIS C. MEIGS,
   FLORENCE M. O'HARA.